(12) United States Patent
Moon

(10) Patent No.: US 7,649,952 B1
(45) Date of Patent: Jan. 19, 2010

(54) LOW COMPLEXITY SOFT DEMAPPING

(75) Inventor: Jaekyun Moon, Plymouth, MN (US)

(73) Assignee: Regents of the University of Minnesota, Saint Paul, MN (US)

( * ) Notice: Subject to any disclaimer, the term of this patent is extended or adjusted under 35 U.S.C. 154(b) by 436 days.

(21) Appl. No.: 11/174,428

(22) Filed: Jul. 1, 2005

Related U.S. Application Data

(60) Provisional application No. 60/584,594, filed on Jul. 1, 2004, provisional application No. 60/584,701, filed on Jul. 1, 2004, provisional application No. 60/584,589, filed on Jul. 1, 2004.

(51) Int. Cl.
*H04L 5/12* (2006.01)
(52) U.S. Cl. ...................................... 375/265
(58) Field of Classification Search ................. 375/262, 375/265, 341; 704/242; 714/792, 795
See application file for complete search history.

(56) References Cited

U.S. PATENT DOCUMENTS

| | | | |
|---|---|---|---|
| 6,480,552 B1 * | 11/2002 | Tonello | 375/265 |
| 7,009,931 B2 | 3/2006 | Ma et al. | |
| 7,068,628 B2 | 6/2006 | Li et al. | |
| 7,088,782 B2 | 8/2006 | Mody et al. | |
| 7,092,457 B1 * | 8/2006 | Chugg et al. | 375/324 |
| 7,116,725 B2 | 10/2006 | Ketchum et al. | |
| 7,120,201 B2 | 10/2006 | Huang et al. | |
| 7,120,405 B2 | 10/2006 | Rofougaran | |
| 7,123,669 B2 | 10/2006 | Ye et al. | |
| 7,123,887 B2 | 10/2006 | Kim et al. | |

| | | | |
|---|---|---|---|
| 2003/0218973 A1 | 11/2003 | Oprea et al. | |
| 2005/0105505 A1 | 5/2005 | Fishler et al. | |

OTHER PUBLICATIONS

Jin et al., "Carrier phase and frequency recovery for MIMO-OFDM," *Globecom 2004*, Dallas, TX, Nov. 2004, pp. 2669-2673.
Kim and Moon, "CCK Demodulation via Symbol Decision feedback equalizer," *IEEE Communications Letters*, Oct. 2004, 8(10): 620-622.
Moon et al., "Channel estimation for MIMO-OFDM systems employing spatial multiplexing," *IEEE Vehicular Technical Conference*, Los Angeles, CA, Sep. 2004, pp. 3649-3654.
Li and Moon, "Performance analysis of bit-interleaved space-time coding for OFDM in block fading channels," *IEEE Vehicular Technical Conference*, Milan, Italy, May 2004, pp. 684-692.
Park and Moon, "Alternative structure for computing APPs of the Markove Source," *IEEE Transactions on Information Theory*, Apr. 2003, 49(4): 1027-1029.
'Antenna DiversityStrengthens Wireless LANs' [online]. Communication Systems Design, 2003, [retrieved on Nov. 7, 2006]. Retrieved from the Internet: <URL: www.commsdesign.com/csdmag/sections/cover_story/OEG20030103S0053>, 7 pages.

(Continued)

*Primary Examiner*—Sam K Ahn
(74) *Attorney, Agent, or Firm*—Fish & Richardson P.C.

(57) ABSTRACT

A method of analyzing soft symbol information in a communication system that transmits multiple independent data streams is disclosed. The method includes setting a trellis structure using a fixed spatial delay constraint, calculating a joint probability between a targeted symbol and a set of observation samples either recursively or nonrecursively, and approximating a likelihood function for a given branch by a single probability density function with mean and variance computed based on available soft information on past symbols relative to the branch that is being currently considered.

8 Claims, 2 Drawing Sheets

OTHER PUBLICATIONS

'Dual Rx boosts WLAN OFDM' [online]. EE Times, 2003, [retrieved on Nov. 7, 2006]. Retrieved from the Internet: <URL:www.eetimes.com/in_focus/mixed_signals/OEG20030926S0018>, 5 pages.

Oenning and Moon, "The Effect of Jitter Noise on Binary Input Intersymbol Interference Channel Capacity," IEEE International Conference on Communications, 2001, vol. 8, pp. 2416-2420.

Li and Moon, "Increasing Data Rates through Iterative Coding and Antenna Diversity in OFDM-Based Wireless Communication," *Globecom 2001*, vol. 5, Nov. 2001, pp. 3130-3134.

Moon and Jeon, "Sequence detection for binary ISI channels using signal space partitioning," *IEEE Transactions on Communications*, Jul. 1998, 46(7): 891-901.

Nair and Moon, "Data storage channel equalization using neural networks," *IEEE Transactions on Neural Networks*, Sep. 1997, 8(5): 1037-1048.

Zeng and Moon, "Decision feedback equalizer with pattern dependent dynamic threshold," *IEEE Transactions on Magnetics*, Jul. 1996, 32(4): 3266-3273.

Shafiee and Moon, "Knowledge-based parameter estimation for identification and equalization of storage channels," *IEEE Transactions on Magnetics*, Jul. 1996, 32(4): 3274-3282.

Moon and Carley, "Efficient sequence detection for intersymbol interference channels with run-length constraints," *IEEE Transactions on Communications*, Sep. 1994, 42(9): 2654-2660.

Caire et al., "Bit-Interleaved Coded Modulation," *IEEE Trans. Inform. Theory*, 1998, 44(3):927-946.

Foschini, "Layered Space-Time Architecture for Wireless Communication in a Fading Environment When Using Multi-Element Antennas," *Bell Labs Technical Journal*, 1996, 1(2):41-59.

Li et al., "Channel Estimation for OFDM Systems with Transmitter Diversity in Mobile Wireless Channels," *IEEE J. Selected Areas Commun.*, 1999, 17(3):461-471.

Li et al., "Robust Channel Estimation for OFDM Systems with Rapid Dispersive Fading Channels," *IEEE Trans. Commun.*, 1998, 46(7):902-915.

Li, "Simplified Channel Estimation for OFDM Systems with Multiple Transmit Antennas," *IEEE Trans. Wireless Commun.*, 2002, 1(1):67-75.

Lu et al., "LDPC-Based Space-Time Coded OFDM Systems Over Correlated Fading Channels: Performance Analysis and Receiver Design," *IEEE Trans. Commun.*, 2002, 50(1):74-88.

Ma et al., "Optimal Training for MIMO Frequency-Selective Fading Channels," *IEEE Trans. Wireless Commun.*, 2005, 4(2):453-466.

Mody and Stüber, "Synchronization for MIMO OFDM Systems," *Globecom 2001*, San Antonio, Texas, Nov. 2001, pp. 509-513.

Moon and Rad, "Turbo Equalization via Constrained-Delay APP Estimation With Decision Feedback," *IEEE Trans. Commun.*, 2005, 53(12):2102-2113.

Park and Lee, "Design Criteria and Performance of Space-Frequency Bit-Interleaved Coded Modulations in Frequency-Selective Rayleigh Fading Channels," *J. Commun. Networks*, 2003, 5(2):141-149.

Tonello, "Space-Time Bit-Interleaved Coded Modulation with an Iterative Decoding Strategy," *Proc. of IEEE Vehicular Technology Conference*, 2000, pp. 473-478.

Wolniansky et al., "V-BLAST: An Architecture for Realizing Very High Data Rates Over the Rich-Scattering Wireless Channel," *Proc. IEEE ISSSE-98*, Pisa, Italy, Sep. 30, 1998, pp. 295-300.

Barhumi et al., "Optimal Training Sequences for Channel Estimation in MIMO OFDM Systems in Mobile Wireless Channels," *Proc. 2002 Intl. Zurich Seminar on Broadband Communications-Access-Transmission-Networking*, IEEE Zurich, Switzerland, Feb. 19-21, 2002, pp. 44-1-44-6.

Berrou et al., "Near Shannon Limit Error-Correcting Coding and Decoding: Turbo Codes," *Proc. IEEE Conf. Communications*, Geneva, Switzerland, May 1993, pp. 1064-1070.

Choi et al., "Iterative Soft Interference Cancellation for Multiple Antenna Systems," *IEEE Wireless Communications and Networking Conference*, Chicago, Illinois, Sep. 2000, pp. 304-309.

Duel-Hallen, "Decorrelating Decision-Feedback Multiuser Detector for Synchronous Code-Division Multiple-Access Channel," *IEEE Trans. Commun.*, 1993, 41(2):285-290.

Hong et al., "A General Approach to Space-Time Trellis Codes," *Proceedings of the 40th Annual Allerton Conference on Communication, Control and Computing*, Monticello, Illinois, Oct. 2002, pp. 161-169.

IEEE Std 802.11a-1999 (Supplement to IEEE Std 802.11-1999), Part 11: wireless LAN medium access control (MAC) and physical layer (PHY) specifications: high-speed physical layer in the 5 GHZ band, 1999.

Jiang and Sidiropoulos, "A direct blind receiver for SIMO and MIMO OFDM systems subject to unknown frequency offset and multipath," *2003 4th IEEE Workshop on Signal Processing*, Rome, Italy, Jun. 2003, pp. 358-362.

Pollet et al., "BER Sensitivity of OFDM Systems to Carrier Frequency Offset and Wiener Phase Noise," IEEE Trans. Commun., 1995, 43(2,3,4):191-193.

ten Brink et al., "Iterative Demapping and Decoding for Multilevel Modulation," Proc. IEEE Globecom Conf,, 1998, pp. 579-584.

\* cited by examiner

```
┌─────────────────────────────┐
│  Set Trellis Structure Using a │
│     Fixed Spatial Delay        │
│         Constraint             │
│                          202   │
└──────────────┬──────────────┘
               │
┌──────────────┴──────────────┐
│  Calculate Joint Probability   │
│    Density Between A           │
│  Targeted Symbol And A Set     │
│   of Observation Samples       │
│    (Recursively or Non-        │
│        Recursively)            │
│                          204   │
└──────────────┬──────────────┘
               │
┌──────────────┴──────────────┐
│   Approximate a Likelihood     │
│    Function For a Given        │
│     Branch By a Single         │
│    Probability Density         │
│   Function – Mean and          │
│  Variance Computed Based       │
│    on Available Soft           │
│  Information On Past           │
│  Symbols Relative To The       │
│   Branch That is Being         │
│     Currently Considered       │
│                          206   │
└─────────────────────────────┘
```

Fig. 2

LOW COMPLEXITY SOFT DEMAPPING

CROSS REFERENCE TO RELATED APPLICATIONS

This application claims priority to U.S. Provisional Application Nos. 60/584,594, filed Jul. 1, 2004; 60/584,701, filed Jul. 1, 2004; and 60/584,589, filed Jul. 1, 2004, and are hereby incorporated by reference in their entirety.

TECHNICAL FIELD

This invention relates to systems and methods for processing of high bandwidth over-the-air data transmission and reception.

BACKGROUND

With increased reliance of all individuals, whether at work or at play, on access to various rich data sources, and with an increased demand to access such rich data sources on-the-road or on-the-run, comes a need for higher data bandwidth in portable computing and communication devices. For instance, users of mobile computing devices—from laptop computers, to cellular telephones, to wristwatches—desire access to more and more data, such as audio, streaming video, and other data-rich applications. There is thus a demand for systems and techniques that can deliver greater wireless bandwidth.

Part of the necessary process of providing high-bandwidth systems is the ability to "locate" an incoming signal and to align with the signal so that transmitted data may be extracted and read from the signal. This process becomes more complex with high bit rate communications. Also, higher bandwidth is sometimes achieved by separating a data stream into multiple simultaneous transmissions through various multiplexing processes. When such an approach is taken, the data in each transmitted signal must be identified and read, and all of the separate data must then be joined back together in the proper order.

Multiple-input and multiple-output (MIMO) communication methods attract considerable attention because of their potential to achieve much higher capacity than the traditional single-input single-output (SISO) methods. While MIMO systems based on space-time coding can be used to improve link reliability (e.g., by providing redundant information paths), MIMO systems incorporating spatial-multiplexing are used mainly to achieve high spectral efficiency. MIMO systems employing orthogonal frequency division multiplexing (OFDM) can achieve high spectral efficiency in rich scattering environments such as indoor wireless local area networks.

MIMO-OFDM systems can effectively exploit frequency diversity of frequency selective channels as well as spatial diversity of uncorrelated parallel wireless links. Bit interleaved coded modulation (BICM) used in conjunction with MIMO-OFDM and spatial multiplexing (SM) is particularly effective in exploring both spatial diversity and frequency selectivity without significant design efforts, and is well-suited for achieving very high data rates. See G. Caire et al., "Bit-interleaved coded modulation," IEEE Trans. Inform. Theory, vol. 44, no. 3, pp. 927-946, May, 1998; A. M. Tonello, "Space-time bit-interleaved coded modulation with an iterative decoding strategy," Proc. of IEEE Vehicular Technology Conference, pp. 473-478, Boston, September, 2000; B. Lu, X. Wang & K. R. Narayanan, "LDPC-based space-time coded OFDM systems over correlated fading channels: perfor-mance analysis and receiver design," IEEE Trans. on Commun., vol. 50, no. 1, pp. 74-88, January, 2002; D. Park and B. G Lee, "Design criteria and performance of space-frequency bit-interleaved coded modulations in frequency selective Rayleigh fading channels," Journal of Commun. and Networks, vol. 5, no. 2, pp. 141-149, June, 2003. In addition to exploiting spatial diversity, MIMO-OFDM systems retain the same advantages as SISO-OFDM systems, namely, reduced equalization complexity for frequency selective channels and an ability to explore frequency diversity through coding.

However, like their SISO-OFDM counterparts, MIMO-OFDM systems can be sensitive to synchronization errors, especially the carrier frequency offset (CFO). A good synchronization scheme is generally necessary to make a MIMO-OFDM system practically viable. Numerous techniques have been suggested in the literature for SISO-OFDM frequency synchronization. However, extension to MIMO systems tends to be difficult. The literature on MIMO-OFDM synchronization is relatively scarce. A training-based method has been proposed that relies on the cyclic prefix and the orthogonal polyphase sequences that can be modulated directly. See A. N. Mody & G. L. Stuber, "Synchronization for MIMO OFDM systems," in Globecom 2001, San Antonio, Tex., November, 2001.

Accurate channel estimation is also important in realizing the full performance potential of MIMO-OFDM systems. Channel estimation becomes a major challenge as the number of channel responses that need be characterized increases substantially, as the number of transmit and receive antennas increases. Previous works exist that identify desirable training patterns for estimating channel responses for MIMO systems. See, e.g., Y. (G.) Li, N. Seshadri, and S. Ariyavisitakul, "Channel estimation for OFDM systems with transmitter diversity in mobile wireless channels," IEEE J. Select Areas Commun., vol. 17, pp. 461-471, March, 1999; Y. (G.) Li, L. J. Cimini, and N. R. Sollegberger, "Robust channels estimation for OFDM systems with rapid dispersive fading channels," IEEE Trans. Commun., vol. 46, pp. 902-915, July, 1998; Y. (G.) Li, "Simplified channel estimation for OFDM systems with multiple transmit antennas," IEEE Trans. Wireless Commun., vol. 1, pp. 67-75, January, 2002; X. Ma et al., "Optimal training for MIMO frequency-selective fading channels," IEEE Trans. Wireless Commun., January, 2004. Other works also appear in this area. See, e.g., H. V Poor "An introduction to signal detection and estimation," Spring-Verlag: New York, 1994.

There remains a need for systems and techniques that can provide extremely high wireless bandwidth in a reliable and cost-effective manner.

SUMMARY

This document explains processes and systems for soft demapping of received signals for wireless communication systems.

In one implementation, a method of analyzing soft symbol information in a communication system that transmits multiple independent data streams is disclosed. The method comprises setting a trellis structure using a fixed spatial delay constraint, calculating a joint probability between a targeted symbol and a set of observation samples either recursively or nonrecursively, and approximating a likelihood function for a given branch by a single probability density function with mean and variance computed based on available soft information on past symbols relative to the branch that is being currently considered.

The available soft information for the past symbols may be obtained through a posteriori probabilities computed during the current iteration. The mean and variance may be computed based on available soft information that depends on future symbols relative to the branch that is currently considered. Also, the available soft information for the future symbols may be obtained through a priori probabilities passed over from an outer decoder in a previous iteration stage.

In some implementations, the available soft information for a future symbol may be replaced by one or more hard decisions derived from observation samples during the current iteration. The available soft information for past symbols may also be obtained through past hard decisions. The number of past symbols and the number of future symbols used in the mean and variance calculations may be adjustable parameters with the values greater than or equal to zero. In addition, a likelihood function for a given branch may be approximated by a sum of multiple probability density functions with means and variances computed based on estimates of past and future symbols.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a flow chart showing a method of analyzing symbol information in a communication system that transmits multiple independent data streams.

Like reference symbols in the various drawings indicate like elements.

DETAILED DESCRIPTION

Figure 1:
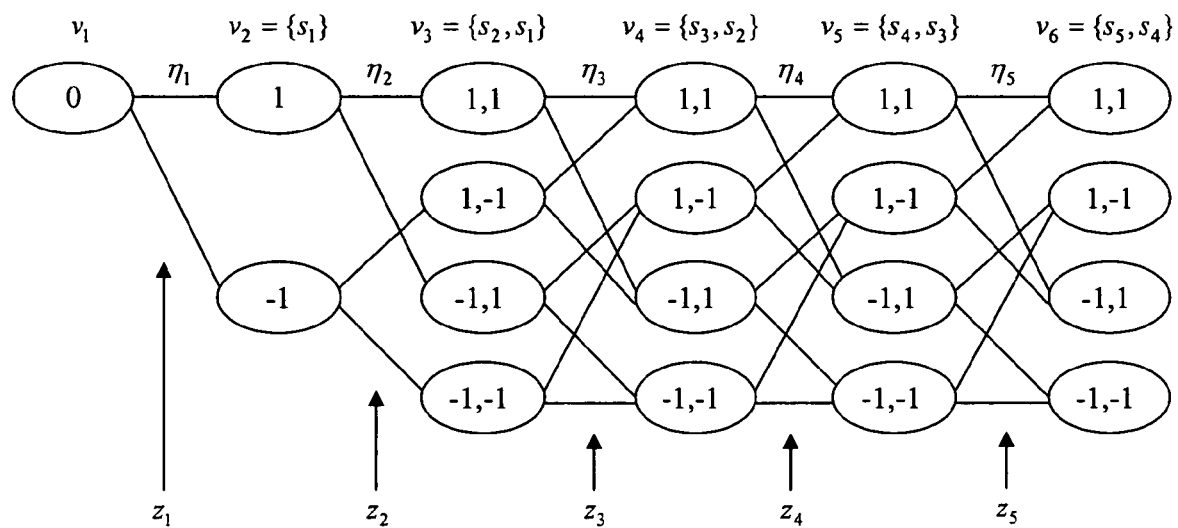
FIG. 1 is a reduced trellis for BPSK.

Soft demapping techniques may be used to improve the acquisition of high-bandwidth over-the-air signals, as described herein. Consider a 5×5 antenna configuration (5 transmit antennas and 5 receive antennas) as an example. After proper signal decomposition, the received signals can be written as:

$$z_1 = H_{11}s_1 + n_1 z_2 = H_{22}s_2 + H_{21}s_1 + n_2 z_3 = H_{33}s_3 + H_{32}s_2 + H_{31}s_1 + n_3 z_4 = H_{44}s_4 + H_{43}s_3 + H_{42}s_2 + H_{41}s_1 + n_4 z_5 = H_{55}s_5 + H_{54}s_4 + H_{53}s_3 + H_{52}s_2 + H_{51}s_1 + n_s \quad (1)$$

where $z_i$ is the received or observation signal at the i-th receive antenna, $s_j$ is the modulated symbol transmitted by the j-th transmit antenna, $n_i$ denotes the noise corrupting the i-th receive signal, and $H_{ij}$ represents the effective channel response of the communication link between the j-th transmit antenna and the i-th receive antenna. For an N×N antenna configuration, the observation signal at the j-th receive antenna is given by $$z_j = H_{jj}s_j + H_{j,j-1}s_{j-1} + \ldots + H_{j1}s_1 + n_j, \quad 1 \leq j \leq N. \quad (23)$$

The techniques discussed here can be applied to cases in which there are a different number of receive antennas (i.e., more) than transmit antennas. Here, we discuss the N×N antenna configuration. The optimal soft detection is based on a trellis representation of the signals. For the multi-input multi-output (MIMO) system, the trellis varies spatially; the number of states at layer j is equal to $M^j$, where M is the size of the symbol constellation.

Low complexity soft detection of $s_j$'s is possible by adopting the approach used for the intersymbol interference channel detection method described in J. Moon & F. Rafiee Rad, "Pragmatic Turbo equalization via constrained-delay detection with soft decision feedback for severe ISI."

In the suboptimal reduced trellis scheme of Moon & Rad, the soft information on symbol $s_{j-\tau}$ is obtained by making use of $z_1^j$, the collection of observation samples $z_1$ through $z_j$. The soft information on symbol $s_{j-\tau}$, namely the a posteriori probability $P(s_{j-\tau}/z_1^j)$, can be obtained once the joint probability density $f(s_{j-\tau},z_1^j)$ is evaluated. Following Moon & Rad, the state and state transition are defined respectively as $$v_j \triangleq s_{j-\tau}^{j-1}, \quad j \geq \tau + 1 \quad (3)$$

$$\eta_j \triangleq \{v_j, v_{j+1}\} = s_{j-\tau}^j, \quad j \geq \tau + 1$$

For $1 \leq j \leq \tau$, we have a spatially varying trellis with the state at the j-th layer given by $$v_j \triangleq s_1^{j-1}$$

($v_1$ is a dummy node, where all trellis paths originate). See FIG. 1 for the resulting trellis corresponding to BPSK, $\tau=2$ and N=5. The joint probability density $f(s_{j-\tau},z_1^j)$ is obtained from the trellis as $$f(s_{j-\tau}, z_1^j) = \sum_{\eta_j(s_{j-\tau})} f(\eta_j, z_1^j), \quad 1 + \tau \leq j \leq N + \tau \quad (4)$$

where the sum is over all state transitions associated with the given $s_{j-\tau}$. In computing the joint probability density for the last symbols $s_{N-\tau+1}$ through $S_N$ using (4) (i.e., when $N+1 \leq j \leq N+\tau$, it is understood that $\eta_{N+m} = \eta_N$ and $z_1^{N+m} = z_1^N$ whenever m>0. The joint probability density $f(\eta_j,z_1^j)$, on the other hand, can be computed recursively (see Moon & Rad):

$$f(\eta_j, z_1^j) = P(s_j) f(z_j/\eta_j, z_1^{j-1}) \sum_{\eta_{j-1}(\eta_j)} f(\eta_{j-1}, z_1^{j-1}), \quad 1 \leq j \leq N \quad (5)$$

where the sum is over all $\eta_{j-1}$'s connected to the given $\eta_j$, and $\Sigma_{\eta_0(\eta_1)} f(\eta_0,z_1^0)$ is initialized to 1.

While a state transition $\eta_j$ is designed to collect only $s_{j-\tau}^j$, the observation $z_j$ does in general depend on all symbols $s_1$ through $s_j$. This issue can be resolved by writing the likelihood function $l(\eta_j) = f(z_j/\eta_j, z_1^{j-1})$ as follows:

$$l(\eta_j) = \sum_{s_1^{j-\tau-1}} f(s_1^{j-\tau-1}, z_j/\eta, z_1^{j-1}) \quad (6)$$

$$= \sum_{s_1^{j-\tau-1}} P(s_1^{j-\tau-1}/\eta_j, z_1^{j-1}) f(z_j/s_1^{j-\tau-1}, \eta_j, z_1^{j-1})$$

$$= \sum_{s_1^{j-\tau-1}} P(s_1^{j-\tau-1}/\eta_j, z_1^{j-1}) f(z_j/s_1^j)$$

for $\tau+2 \leq j \leq N$. For $1 \leq j \leq \tau+1$, we simply have $l(\eta_j)=f(z_j/s_1^j)$. See FIG. 1. It can be seen that the likelihood function is a weighted sum of Gaussian probability density functions (pdfs).

One effective way of reducing computation is to approximate this weighted linear sum of many Gaussian pdfs with a single Gaussian pdf. That is, we write $l(\eta_j) \approx N(\mu_{T_j}, \sigma_{T_j})$ for some mean $\mu_{T_j}$ and variance $\sigma_{T_j}^2$. Following the approach of Moon & Rad, the "overall mean" $\mu_{T_j}$ and the "overall variance" $\sigma_{T_j}^2$ can be obtained as $$\mu_{T_j} = \sum_{i=0}^{\tau} H_{j,j-i} s_{j-i} + \sum_{i=\tau+1}^{j-1} H_{j,j-i} \bar{s}_{j-i} \quad (7)$$

$$\sigma_{T_j}^2 = \sigma^2 + \sum_{i=\tau+1}^{j-1} |H_{j,j-i}|^2 \sigma_{j-i}^2 \quad (8)$$

for $1 \leq j \leq N$, where $$\bar{s}_l = \sum_{s_l} P(s_l) s_l, \sigma^2$$

is the variance of additive noise and $$\sigma_l^2 = \sum_{s_l} P(s_l) |s_l - \bar{s}_l|^2.$$

It is implied that $\bar{s}_l=0$ and $\sigma_l=0$ for $l<1$. The actual computation is done based on the updated a posteriori probabilities available from previous detection layers, i.e., with $P(s_l) \leftarrow P(s_l/z_1^{l+\tau})$ for $1 \leq l \leq j-\tau-1$. Note that an underlying approximation is:

$$P(s_1^{j-\tau-1}/\eta_j, z_1^{j-1}) \approx \prod_{i=1}^{j-\tau-1} P(s_i/z_1^{i+\tau}).$$

Further Improvement in Performance/Complexity Tradeoff

The performance can be further improved by allowing a longer decision delay. However, increasing $\tau$ results in an exponential increase in complexity as the complexity of the proposed scheme is proportional to $M^{\tau+1}$. Instead, the following approach allows a longer decision delay without increasing the computational load significantly. Consider the joint probability density $f(s_{j-\tau}, z_1^{j+\lambda})$ that can be obtained from the same trellis as $$f(s_{j-\tau}, z_1^{j+\lambda}) = \sum_{\eta_j(s_{j-\tau})} f(\eta_j, z_1^{j+\lambda}), \, 1+\tau \leq j \leq N+\tau. \quad (9)$$

The decision delay is now $\tau+\lambda$. As before, it is understood that $\eta_{N+m}=\eta_N$ and $z_1^{N+m}=z_1^N$ whenever $m>0$. The joint probability density $f(\eta_j, z_1^{j+\lambda})$ can be computed recursively:

$$f(\eta_j, z_1^{j+\lambda}) = P(s_j/z_j^{j+\lambda-1}) f(z_{j+\lambda}/\eta_j, z_1^{j+\lambda-1}) \sum_{\eta_{j-1}(\eta_j)} f(\eta_{j-1}, z_1^{j+\lambda-1}), \quad (10)$$

$$1 \leq j \leq N$$

where $\sum_{\eta_0(\eta_1)} f(\eta_0, z_1^0)$ is initialized to 1. The probability $P(s_j/z_j^{j+\lambda-1})$ cannot be computed exactly, but can be approximated by the a priori probability, which will be updated at each iterative stage in the case of iterative demapping and decoding. The modified likelihood function $l(\eta_j)=f(z_{j+\lambda}/\eta_j, z_1^{j+\lambda-1})$ is written as $$l(\eta_j) = \sum_{s_1^{j-\tau-1}, s_{j+1}^{j+\lambda}} f(s_1^{j-\tau-1}, s_{j+1}^{j+\lambda}, z_{j+\lambda}/\eta_j, z_1^{j+\lambda-1}) \quad (11)$$

$$= \sum_{s_1^{j-\tau-1}, s_{j+1}^{j+\lambda}} P(s_1^{j-\tau-1}, s_{j+1}^{j+\lambda}/\eta_j, z_1^{j+\lambda-1}) f(z_{j+\lambda}/s_1^{j-\tau-1}, s_{j+1}^{j+\lambda}, \eta_j, z_1^{j+\lambda-1})$$

$$= \sum_{s_1^{j-\tau-1}, s_{j+1}^{j+\lambda}} P(s_1^{j-\tau-1}, s_{j+1}^{j+\lambda}/\eta_j, z_1^{j+\lambda-1}) f(z_{j+\lambda}/s_1^{j+\lambda})$$

$$= \sum_{s_1^{j-\tau-1}, s_{j+1}^{j+\lambda}} P(s_1^{j-\tau-1}/\eta_j, z_1^{j+\lambda-1}) P(s_{j+1}^{j+\lambda}/s_1^j, z_1^{j+\lambda-1}) f(z_{j+\lambda}/s_1^{j+\lambda})$$

which is also a weighted sum of Gaussian pdfs and so again approximated as $l(\eta_j) \approx N(\mu_{T_j}, \sigma_{T_j})$ for some overall mean $\mu_{T_j}$ and variance $\sigma_{T_j}^2$ but now with modified expressions:

$$\mu_{T_j} = \sum_{i=1}^{\lambda} H_{j,j+i}\bar{s}_{j+i} + \sum_{i=0}^{\tau} H_{j,j-i}s_{j-i} + \sum_{i=\tau+1}^{j-1} H_{j,j-i}\bar{s}_{j-i} \quad (12)$$

$$\sigma_{T_j}^2 = \sum_{i=1}^{\lambda} |H_{j,j+i}|^2 \sigma_{j+i}^2 + \sigma^2 + \sum_{i=\tau+1}^{j-1} |H_{j,j-i}|^2 \sigma_{j-i}^2 \quad (13)$$

for $1 \leq j \leq N$. As before, we make an approximation $$\bar{s}_l \approx \sum_{s_l} P(s_l/z_1^{l+\tau})s_l, \quad \sigma_l^2 \approx \sum_{s_l} P(s_l/z_1^{l+\tau})|s_l - \bar{s}_l|^2$$

for $1 \leq l \leq j-\tau-1$ based on a posteriori probabilities available from the previous detection layer during the current iteration, while $$\bar{s}_l \approx \sum_{s_l} P(s_l)s_l, \quad \sigma_l^2 \approx \sum_{s_l} P(s_l)|s_l - \bar{s}_l|^2$$

for $j+1 \leq l \leq j+\lambda$ based on a priori probabilities updated by the decoder during the previous iteration since a posteriori probabilities are not available for $s_l$, $j+1 \leq l \leq j+\lambda$. It is understood that here $\bar{s}_l=0$ and $\sigma_l=0$ for $l<1$ or $l>N$. The implied approximation here is that $$P(s_1^{j-\tau-1}/\eta_j, z_1^{j+\lambda-1})P(s_{j+1}^{j+\lambda}/s_1^j, z_1^{j+\lambda-1}) \approx \prod_{i=1}^{j-\tau-1} P(s_i/z_1^{i+\tau}) \prod_{l=j+1}^{j+\lambda} P(s_l).$$

Note that the state is not defined when $\tau=0$ (i.e., no trellis); in this case, the scheme simply reduces to essentially symbol-by-symbol detection even when $\lambda>0$. One desirable feature for $\tau=0$ is that the simple near-optimal demapper geared to Gray mapping can be used that relies on separate processing of quadrature components of the observation signal. It is easy to extend (12) and (13) to the case of $\lambda=N$, so that when processing layer j the average effect of all symbols from j+1 through N is taken into account.

An Alternative Approach to Computing (5)

The joint pdf $f(\eta_j, z_1^j)$ in (5) can also be computed non-recursively. That is, instead of accumulating the current-layer likelihood function $f(z_j/\eta_j)$ onto the previous-layer pdf of $f(\eta_{j-1}, z_1^{j-1})$, we attempt to directly compute the likelihood function only based on the current $(\tau+1)$ layers, and add them anew each cycle. Treating the averaged soft decision sequence $\bar{s}_l$, $1 \leq l \leq j-\tau-1$, as the correct past decision sequence, $f(\eta_j, z_1^j)$ can be approximated by $$f(\eta_j, z_1^j) \approx f(\eta_j, z_1^j/\bar{s}_1^{j-\tau-1}) \quad (14)$$

$$= f(\eta_j, z_{j-\tau}^j, z_1^{j-\tau-1}/\bar{s}_1^{j-\tau-1})$$

-continued
$$= P(\eta_j)f(z_{j-\tau}^j/\eta_j, \bar{s}_1^{j-\tau-1})f(z_1^{j-\tau-1}/\bar{s}_1^{j-\tau-1}).$$

The third term in the last expression in (14) is common to all $\eta_j$'s and so can be treated as a normalization constant. Due to the fact that the observation samples $z_j, z_{j-1}, \ldots, z_{j-\tau}$ are independent when conditioned on the symbols $s_j, s_{j-1}, \ldots, s_1$, (14) can be computed as $$f(\eta_j, z_1^j) = C \prod_{i=0}^{\tau} P(s_{j-i})f(z_{j-i}/\eta_j, \bar{s}_1^{j-\tau-1}) \quad (15)$$

where C is the constant and $f(z_{j-i}/\eta_j, \bar{s}_1^{j-\tau-1})$, $0 \leq i \leq \tau$, can be obtained as in (6)$\approx$(8). Specifically, $$f(z_{j-i}/\eta_j, \bar{s}_1^{j-\tau-1}) = f(z_{j-i}/s_{j-\tau}^{j-i}, \bar{s}_1^{j-\tau-1}) \quad (16)$$

$$\approx N(\mu_{T_{j-i}}, \sigma_{T_{j-i}})$$

with the "overall mean" $\mu_{T_{j-i}}$ and the "overall variance" $\sigma_{T_{j-i}}^2$ given by $$\mu_{T_{j-i}} = \sum_{i=j-\tau}^{j-i} H_{j-i,i}s_i + \sum_{i=1}^{j-\tau-1} H_{j-i,i}\bar{s}_i \quad (17)$$

$$\sigma_{T_{j-i}}^2 = \sigma^2 + \sum_{i=1}^{j-\tau-1} |H_{j-i,i}|^2 \sigma_i^2$$

where $\bar{s}_i$ and $\sigma_i^2$ are defined as in (7) and (8). This is for the case $\lambda=0$, but the approach can be extended to the case $\lambda>0$ with the application of the method summarized in (9)$\approx$(13).

It has been shown by simulations that the two approaches to computing $f(\eta_j, z_1^j)$—by (5) and (15)—result in essentially the same performance. However, the use of the non-recursive computation specified in (15) suggests a further complexity reduction scheme. As seen in (15) and (16), the branch metrics $f(z_{j-i}/s_{j-\tau}^{j-i}, \bar{s}_1^{j-\tau-1})$ are to be computed at $\tau+1$ layers ($\tau \leq i \leq 0$) in each cycle (i.e., for each value of j, except at the boundary). At the $\tau+1$ layer (i.e., for i=0, for example, $f(z_j/s_{j-\tau}^j, \bar{s}_1^{j-\tau-1})$ must be computed for all $M^{\tau+1}$ combinations of symbols in $s_{j-\tau}^j$. The required level of implementation complexity is very high when M is large, even for a small value of $\tau$.

A complexity reduction is possible by considering only a subset of branches beyond the initial local layer (i.e., i=$\tau$). Take $\tau=1$ as an example. The branch metrics at the initial local layer $f(z_{j-1}/s_{j-1}, \bar{s}_1^{j-2})$ are computed as usual for all M symbols of $s_{j-1}$. Then, when computing $f(z_j/s_{j-1}^j, \bar{s}_1^{j-2})$ for the next step, only $M_1$ out of M symbols are considered for $s_j$ (but all M symbols are still considered for $s_{j-1}$), resulting in $M_1 \times M$ computations rather than $M^2$ computations.

Our simulation results for 64-QAM (M=64) and $\tau=1$ indicate that this reduced complexity scheme with $M_1=1$ results in only a small loss of performance. The resulting complexity is comparable to the canonical layer-by-layer cancellation/suppression method for VBLAST (P. W. Wolniansky et al., "V-blast: an architecture for realizing very high data rates over the rich-scattering wireless channel," Proc. ISSUE'98, September 1998), but with large performance improvement. Different criteria are possible for selecting $M_1$ symbols. In our simulation experience, one particular method that chooses $M_1$ symbols based on the "nearest-neighbor" rule (i.e., choose the nearest $M_1$ symbols from the observation sample after subtracting the effect of the other symbols affecting the observation) has been effective.

FIG. 2 is a flow chart showing a method of analyzing symbol information in a communication system that transmits multiple independent data streams. At box 202 of the process, a trellis structure is set using a fixed spatial delay constraint. At box 204, a joint probability is calculated between a targeted symbol and a set of observation samples. The computation may be performed recursively or nonrecursively. At box 206, a likelihood function is approximated for a given branch by a single probability density function. A mean and variance for the function are computed based on available soft information on past symbols relative to the branch that is being currently considered. The mean and variance can be computed based on available soft information that depends on future symbols relative to the branch that is currently considered. The available soft information for past symbols can be obtained through a posteriori probabilities computed during the current iteration, and can be obtained through past hard decisions. Available soft information for future symbols can be obtained through a priori probabilities passed over from an outer decoder in a previous iteration stage, and can be replaced by one or more hard decisions derived from observation samples during the current iteration. The number of past symbols and the number of future symbols used in the mean and variance calculations can be adjustable parameters with the values greater than or equal to zero. Also, a likelihood function for a given branch can be approximated by a sum of multiple probability density functions with means and variances computed based on estimates of past and future symbols.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The systems and techniques may be implemented in hardware, firmware, or software as part of the logical physical (PHY) layer under the ISO/OSI network model. The system may be included on a single chip with other components, such as a media access controller (MAC), and may be included with other PHY and MAC instantiations on a single chip for multiple port applications, such as on a switch or router. The techniques may allow for receipt and interpretation of multiple types of data, such as actual transmitted data packets, and also data such as auto negotiation and other link set-up and maintenance information. In a multi-speed or multi-protocol application, the system may be bypassed or otherwise avoided for lower-bandwidth transmission, such as if an auto negotiation process determines that incoming signals are part of a lower bandwidth (e.g., 802.11a, 802.11b, or 802.11g) signal.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of analyzing soft symbol information in a communication system that transmits multiple independent data streams, comprising:
   setting a trellis structure using a fixed spatial delay constraint;
   calculating, using a processor, a joint probability density between a targeted symbol and a set of observation samples either recursively or nonrecursively; and
   approximating, using the processor, a likelihood function for a given branch by a single probability density function with mean and variance computed based on available soft information on past symbols relative to the branch that is being currently considered.

2. The method of claim 1, wherein the available soft information for the past symbols is obtained through a posteriori probabilities computed during current iteration.

3. The method of claim 1, wherein the mean and variance are computed based on available soft information that depends on future symbols relative to the branch that is currently considered.

4. The method of claim 3, wherein the available soft information for the future symbols is obtained through a priori probabilities passed over from an outer decoder in a previous iteration stage.

5. The method of claim 3, wherein the available soft information for a future symbol is replaced by one or more hard decisions derived from observation samples during current iteration.

6. The method of claim 1, wherein the available soft information for past symbols is obtained through past hard decisions.

7. The method of claim 3, wherein the number of past symbols and the number of future symbols used in the mean and variance calculations are adjustable parameters with the values greater than or equal to zero.

8. The method of claim 1, wherein the likelihood function for a given branch is approximated by a sum of multiple probability density functions with means and variances computed based on estimates of past and future symbols.

* * * * *

UNITED STATES PATENT AND TRADEMARK OFFICE
CERTIFICATE OF CORRECTION

PATENT NO. : 7,649,952 B1  Page 1 of 1
APPLICATION NO. : 11/174428
DATED : January 19, 2010
INVENTOR(S) : Jaekyun Moon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Twenty-third Day of November, 2010

David J. Kappos
*Director of the United States Patent and Trademark Office*